J. T. Frankelberger's Cultivator.

72622

PATENTED
DEC 24 1867

Witnesses                Inventor

United States Patent Office.

J. T. FRANKEBERGER, OF HENSLY, ILLINOIS.

Letters Patent No. 72,622, dated December 24, 1867.

IMPROVEMENT IN CULTIVATORS.

*The Schedule referred to in these Letters Patent and making part of the same.*

TO ALL WHOM IT MAY CONCERN:

Be it known that I, J. T. FRANKEBERGER, of Hensly, in the county of Champaign, and State of Illinois, have invented certain new and useful Improvements in Corn-Cultivators; and I do hereby declare that the following is a full, clear, and exact description thereof, reference being had to the accompanying drawings, and to the letters of reference marked thereon, which form a part of this specification. In the drawings annexed, which make a part of this specification—

Figure 1:
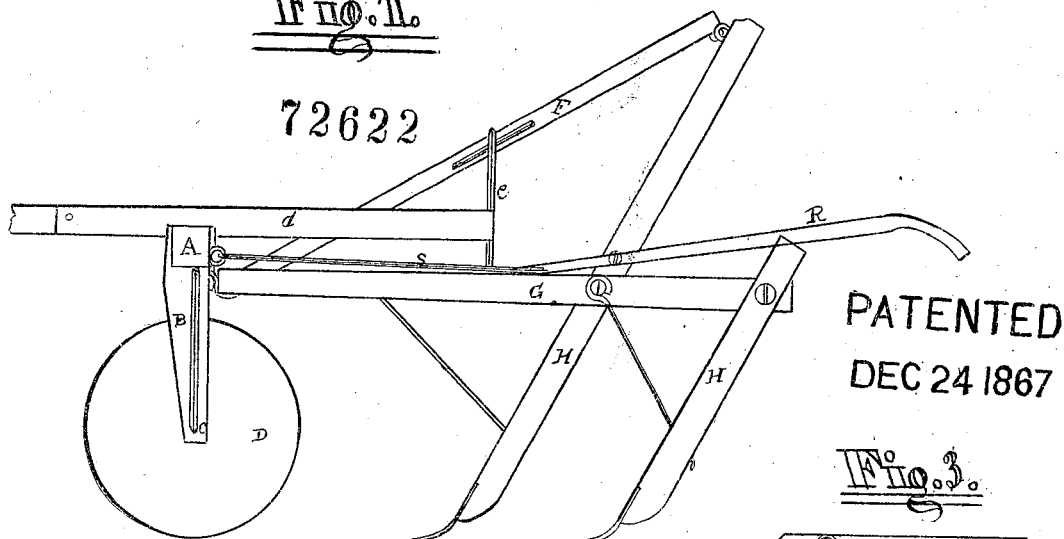
Figure 1 represents a side elevation of my cultivator.
Figure 3:
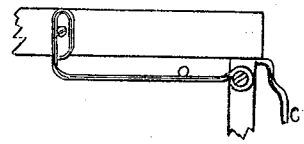
Figure 2:
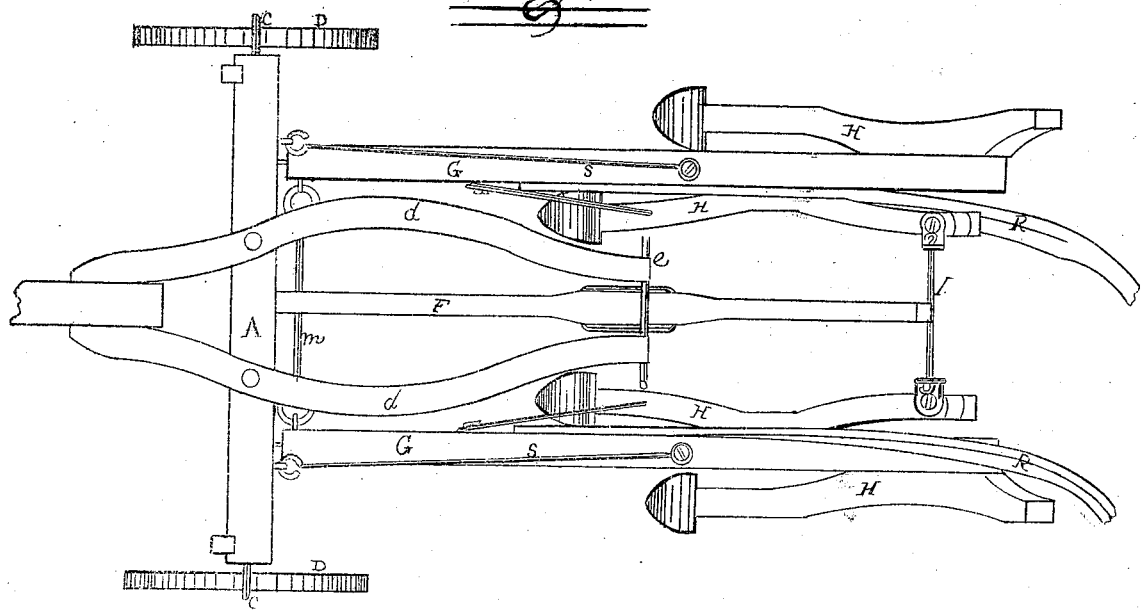
Figure 2 is a plan view of the same.

Figure 3, the rods which support the beams G G at the front end.

A represents a bar of scantling of suitable size, to the ends of which the pendants B are firmly secured. The axles C, on which the wheels D rotate, after passing through said wheels, are bent upwards and driven in the ends of bar A. $d\ d$ designate the hounds, the inner ends of which are held together by the rod $e$, which at top forms a staple-shaped device. Through this staple the bar F is intended to pass, for the purpose hereinafter described. The rod $e$ being fastened or coiled around bolts in the hounds $d\ d$, will be bent out at both ends, at right angles with the hounds $d\ d$. G G represent two beams, to which the shovel-standards H are fastened, two of said standards being bolted to the outside of the beams, near their end, and the other two a little in advance and on the inside of the beams G G. The beams G G are attached to A by the rods $s\ s$, one end of said rods being secured to the beam, and the other end formed into a hook, which enters into corresponding eyes in the side of A. The two beams G G are kept apart at their front end by the rod $m$, and rest on rod $o$ (see fig. 3) by means of a hook projecting from the ends of said beams. The rear end of bar F reaches near the top of the two front standards H, and is attached to said standards by means of a staple, through which the rod $k$ passes, the said rod being secured to the standards by passing through wire loops fastened to the standards H. R represents the handles by which the beams are controlled, and either thrown apart or brought nearer together at the pleasure of the operator.

Having thus described my invention, what I claim, and desire to secure by Letters Patent, is—

1. The combination of the beams G G, when hinged at their front ends to the bar A, substantially in the manner set forth.

2. The beams G G, when combined with the standards H, the handles R, and bars F and A, the whole constructed and operating substantially as herein described.

In testimony that I claim the foregoing as my own, I affix my signature in presence of two witnesses.

J. T. FRANKEBERGER.

Witnesses:
CHARLES MINER,
GEORGE FRANKEBERGER.